United States Patent [19]

DeKock et al.

[11] 4,043,435
[45] Aug. 23, 1977

[54] ARRANGEMENT FOR ADJUSTING THE DAMPING FORCE OF A SHOCK ABSORBER

[75] Inventors: Cornelis DeKock, Oud-Beijerland; Floris Hendrik Breure, Zuid-Beijerland, both of Netherlands

[73] Assignee: ITT Industries, Inc., New York, N.Y.

[21] Appl. No.: 683,922

[22] Filed: May 6, 1976

[30] Foreign Application Priority Data

June 2, 1975 Netherlands .......................... 7506497

[51] Int. Cl.² .............................................. F16F 9/34
[52] U.S. Cl. .................................................. 188/319
[58] Field of Search .............. 188/278, 300, 309, 310, 188/317, 319, 322

[56] References Cited

U.S. PATENT DOCUMENTS 3,937,307   2/1976   DeKock ................. 188/319

Primary Examiner—Duane A. Reger
Attorney, Agent, or Firm—James B. Raden; William J. Michals

[57] ABSTRACT

A shock absorber for automotive vehicles is disclosed, in which the damping force is adjusted by pushing an adjustment pin in the piston head while rotating the piston rod thereby regulating the size of an opening in the piston head. The invention provides a dust cover or shroud which is rotatably mounted about the piston rod and head and includes an opening to provide access to the adjustment pin.

6 Claims, 3 Drawing Figures

ARRANGEMENT FOR ADJUSTING THE DAMPING FORCE OF A SHOCK ABSORBER

BACKGROUND OF THE INVENTION

1. Field of the Invention

The invention relates to an arrangement for adjusting the damping force in the piston of a telescopic shock absorber.

It relates more particularly to an exemplary shock absorber which includes a cylinder in which a piston connected to the piston rod is movable through a cylinder cover and in which the damping force is limited by the position of an adjusting member rotatable with respect to the piston where the adjusting member regulates the size of a passage through the piston and be placed into engagement with a stop member in the end position of the piston near the cylinder cover. The stop member is movable axially in the cylinder cover and from the outside may be brought in the operative position through which by rotating the piston by means of the piston rod the rotating of the adjusting member is prevented and the position of the adjusting member with respect to the piston may be changed.

2. Description of the Prior Art

An adjusting device similar to the foregoing is the subject of the Dutch Patent Application No. 7314047, C. deKock, corresponding to U.S. Pat. No. 3,937,307 which issued Feb. 10, 1976.

When the shock absorber provided with a similar device is equipped with a sleeve surrounding the piston rod to protect the piston rod, the sleeve cannot surround completely the part of the piston rod extending from the cylinder cover if the shock absorber is in its extended position because during the turning of the piston rod with the sleeve, the adjusting device in the cylinder cover must be accessible.

With this restricted protection of the extending part of the piston rod, the piston rod is exposed to damage due to stones hitting it and dirt collecting, because of which efficient operation of the shock absorber is impaired.

SUMMARY OF THE INVENTION

A primary object of the invention is to provide a construction in which the piston rod in a shock absorber, even in its completely extended position, is protected and the adjusting device remains operational.

The shock absorber according to the invention is arranged in such a way that the part of the piston rod extending outside the cylinder is surrounded by a coaxial protecting sleeve rotatable around the piston rod and connected at one end with the piston rod and in which the sleeve surrounds completely the extending part of the piston rod in the end position of the piston. The sleeve is provided with an opening, which is at a small distance in said piston from the cylinder cover and through which the adjusting device is accessible.

Herewith is obtained that the piston rod is completely protected over the extending part outside the cylinder in each position of the shock absorber.

DESCRIPTION OF THE DRAWING

The invention will be explained further with reference to an embodiment shown in the related drawings, in which.

DETAILED DESCRIPTION

Figure 1:
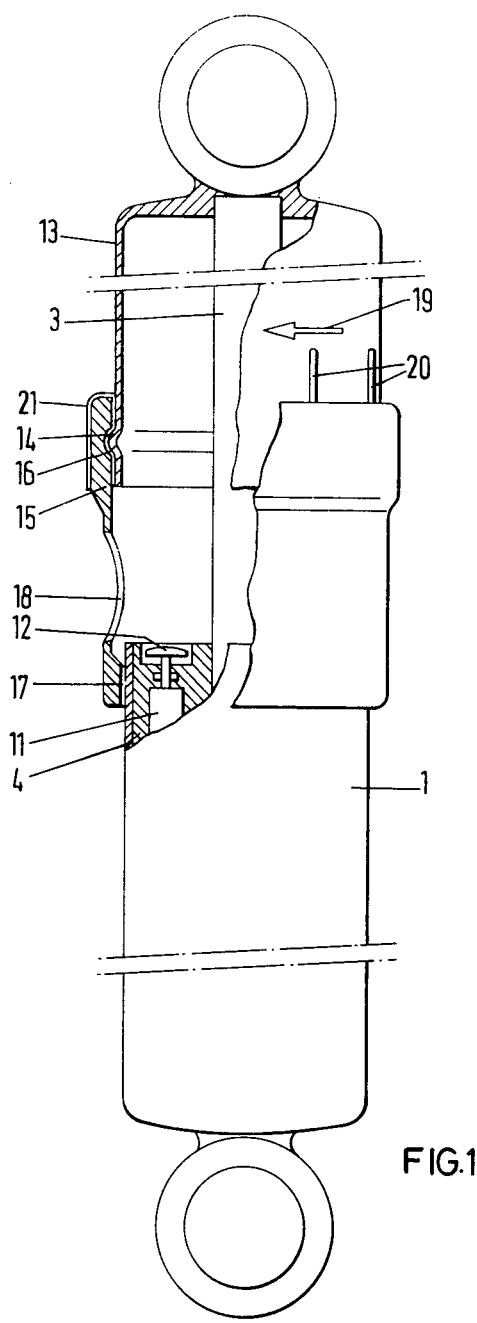
FIG. 1 represents a plan view partly in cross section of a shock absorber in which an adjusting device is installed according to the invention.
Figure 2:
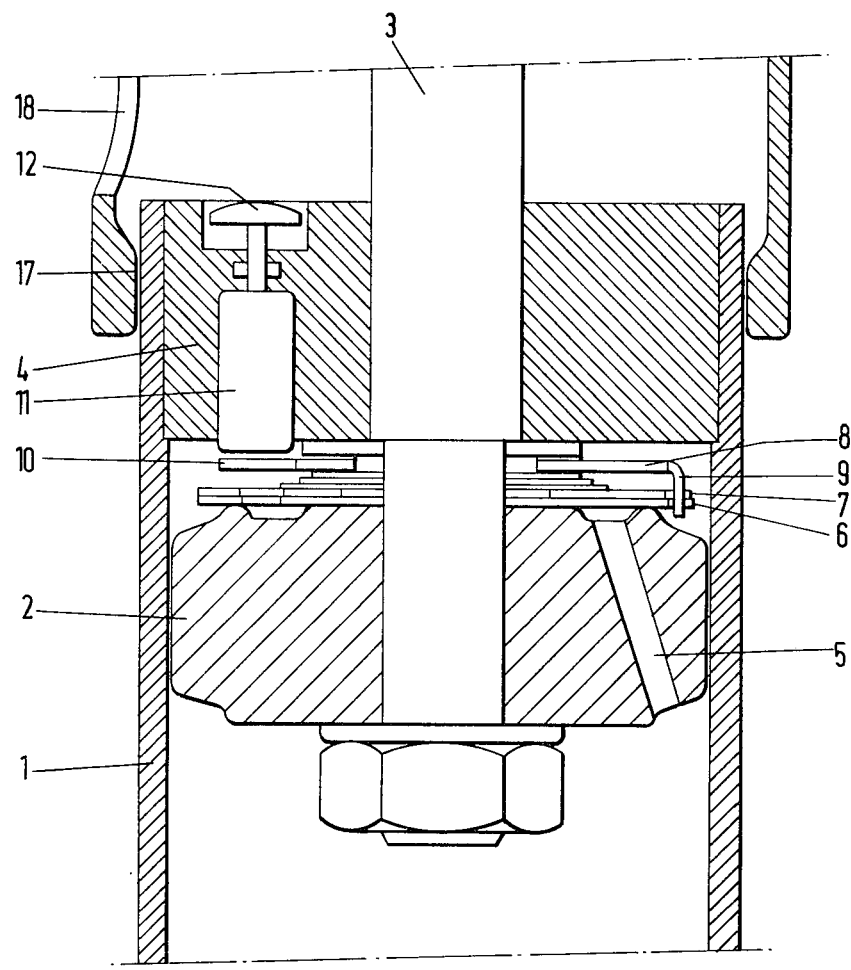
FIG. 2 is a longitudinal section of the adjusting device as provided in the shock absorber according to FIG. 1; and, FIG. 3 is a perspective view of a part of the adjusting device according to the invention.

In FIG. 1, the cylinder 1 of a telescopic shock absorber is shown in which a piston 2 (FIG. 2) is connected to a piston rod 3 which extends outwardly through the cylinder cover 4. The piston 2 is provided with one or more passages 5 which can be closed more or less my means of closure members 6 and 7 of which member 6 is firmly connected to the piston and member 7 is rotatable around the piston rod 3.

The position of the closure member 7 can be varied in relation to member 6 and piston 2 by means of the adjusting member 8, which is also rotatable around piston rod 3 and acts with its axial extension 9 upon the circumference of closure member 7.

The adjusting member 8 is provided furthermore with one or more recesses 10 with which the stop member 11 can cooperate where the stop member is axially mvoable in the cylinder cover 4 and is held in the illustrated non-working position by means not shown, namely the tension of a spring or the pressure of a gas medium present in the cylinder.

The operative position of the stop member 11 is attained by moving the stop member 11 at the outer side of the cylinder cover 4 with the aid of the button 12 against the pressure of the spring to bring the stop member 11 in cooperation with a recess 10 of the adjusting member 8. The adjusting member 8 may be brought if necessary to the correct position by rotating the piston rod 3.

The rotation of piston rod 3 can be controlled with the aid of the protecting sleeve 13 connected at one end to the piston rod and near the other end provided with one or more external elevations 14.

A second sleeve 15 is rotatable around the first sleeve 13 and provided with an internal groove 16, covering the elevations 14 of the first cover 13. The other end of sleeve 15 surrounds the end of cylinder 1 and is provided with one or more thickenings 17 for guiding the sleeve 15 around the cylinder 1.

Figure 3:
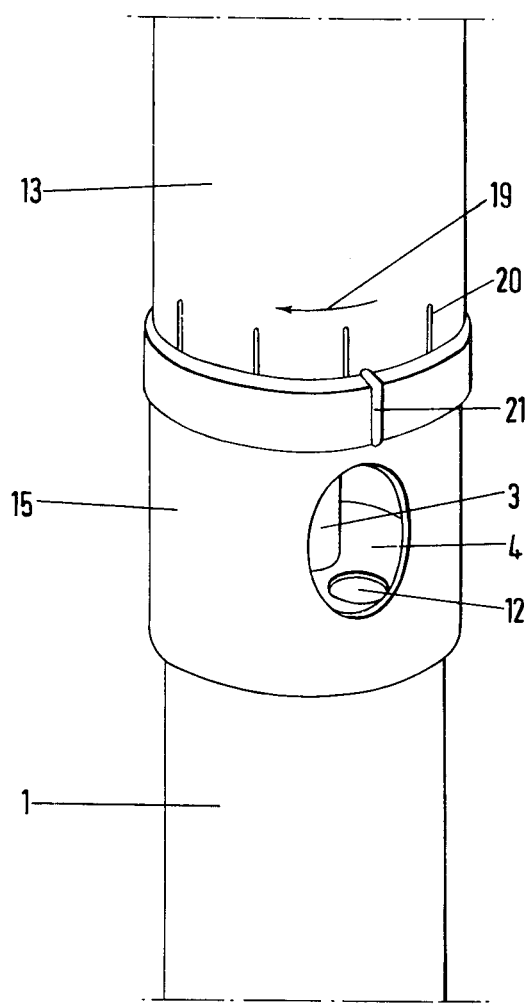

The periphery of sleeve 15 is provided with an opening 18 and the periphery of sleeve 15 as well as of sleeve 13 are provided with indication means 19, 20 and 21 (FIG. 3) with which the mutual rotation angle between the two sleeves can be indicated.

The working of the adjusting arrangement is as follows: The shock absorber is adjusted to its completely extended position. The sleeve 15 is now rotated till the opening 18 is in line with the button 12 of the stop member 11. By pushing the finger of one hand through the opening 18 it is possible to push in the stop member 11 in which at the same time the sleeve 13 can be rotated with the other hand if the stop member 11 is not in line with a recess 10 of the adjusting member 8.

By further rotation of the sleeve 13, it is possible to adjust the passage 5 in the piston in which the adjustment is dependent on the rotation angle between the piston 2 and the adjusting member 8 in which the rotation angle corresponds with the rotation angle between the rotating sleeve 15 and the arrested sleeve 13. The indication means 20 and 21 give herewith an indication of the rotation.

If sleeve 15 is made from elastic material, it is then possible to keep the opening 18 closed by cutting the opening out of the periphery of the sleeve 15 except at an end portion thereof, thereby making a hinge of the part in the periphery. The stop member 11 can then be reached by inwardly bending of the flap.

What has been taught, then, is an arrangement for adjusting the damping force of a shock absorber facilitating, notably, automotive applications. The form of the invention illustrated and described herein is but a preferred embodiment of these teachings, in the form currently preferred for manufacture. It is shown as an illustration of the inventive concept, however, rather than by way of limitation, and it is pointed out that various modifications and alterations may be indulged in within the scope of the appended claims.

What is claimed is:

1. An arrangement for adjusting the damping force in the piston of a telescopic shock absorber comprising a cylinder having a cover enclosing a piston and a piston rod connected to said piston, said piston rod extending through said cylinder cover to be movable therethrough, the damping force of the shock absorber being determined by the position of an adjusting member rotatable about said piston, said adjusting member positioning closure members which regulate the size of a passage in the piston, said adjusting member being held in a position through engagement with a stop member in the end position of the piston near said cylinder cover, said stop member being movable axially in said cylinder cover and being engageable from outside said cylinder cover to assume an operative position through which by rotating said piston by means of said piston rod, rotation of the adjusting member is thereby prevented, the part of the piston rod extending outside said cylinder being surrounded by a coaxial protecting sleeve rotatable around said piston rod and connected at one end with said piston rod, said protecting sleeve completely surrounding the extending part of said piston rod when said piston is in the end position near said cylinder cover, and an opening in said protecting sleeve through which said stop member is accessible.

2. The invention according to claim 1, in which said protecting sleeve is formed by means of two parts of which one part is securely connected to said piston rod and the other part is coaxially rotatable around said first part and is provided with the adjusting opening.

3. The invention according to claim 1, in which the part of said protecting sleeve in which the adjusting opening is provided also surrounds a part of the cylinder and is provided in the inner side with one or more thickened portions by which the protective sleeve has a guide around the cylinder.

4. The invention according to claim 2, in which the part of said protecting sleeve in which the adjusting opening is provided also surrounds a part of the cylinder and is provided in the inner side with one or more thickened portions by which the protecting sleeve has a guide around the cylinder.

5. The invention according to claim 2, in which both parts of said protecting sleeve are provided with indication means facing each other in predetermined mutual positions of the parts of said sleeve for indicating the mutual angle rotation between two parts of the sleeve.

6. The invention according to claim 4 in which both parts of said protecting sleeve are provided with indication means facing each other in predetermined mutual positions of the parts of said sleeve for indicating the mutual angle rotation between both parts of the sleeve.

* * * * *